US012723337B2

(12) United States Patent
Roesner et al.

(10) Patent No.: US 12,723,337 B2
(45) Date of Patent: Sep. 1, 2026

(54) METHOD OF MAKING A MOLDED PART AND PART MADE THEREBY

(71) Applicants: Andreas Roesner, Bonn (DE); Markus Wuescht, Rheinbach (DE); Tim Carsten Pohl, Cologne (DE)

(72) Inventors: Andreas Roesner, Bonn (DE); Markus Wuescht, Rheinbach (DE); Tim Carsten Pohl, Cologne (DE)

(73) Assignee: Reifenhaeuser Gi Co.KG Maschinenfabrik, Troisdorf (DE)

( * ) Notice: Subject to any disclaimer, the term of this patent is extended or adjusted under 35 U.S.C. 154(b) by 154 days.

(21) Appl. No.: 18/617,870

(22) Filed: Mar. 27, 2024

(65) Prior Publication Data

US 2025/0305195 A1 Oct. 2, 2025

(30) Foreign Application Priority Data

Apr. 17, 2023 (DE) ......................... 102023109607.9

(51) Int. Cl.

| | |
|---|---|
| ***D04H 5/02*** | (2012.01) |
| ***B29C 70/08*** | (2006.01) |
| ***B29C 70/46*** | (2006.01) |
| *B29L 31/00* | (2006.01) |

(52) U.S. Cl.

CPC ............. *D04H 5/02* (2013.01); *B29C 70/081* (2013.01); *B29C 70/46* (2013.01); *B29K 2995/006* (2013.01); *B29K 2995/0069* (2013.01); *B29L 2031/712* (2013.01); *D10B 2401/12* (2013.01); *D10B 2505/10* (2013.01)

(58) Field of Classification Search

None

See application file for complete search history.

(56) References Cited

U.S. PATENT DOCUMENTS

2012/0270009 A1 * 10/2012 Kawabe .................... B32B 5/12 428/196

FOREIGN PATENT DOCUMENTS

| | | | |
|---|---|---|---|
| DE | 102019109911 A1 * | 10/2020 | ............. D04H 1/559 |
| DE | 102021118909 B3 * | 9/2022 | ........... D01D 5/0985 |

* cited by examiner

*Primary Examiner* — Yung-Sheng M Tsui

(74) *Attorney, Agent, or Firm* — Andrew Wilford

(57) ABSTRACT

A molded part is made from at least one nonwoven web having at least one layer of a filament/fiber mixture by the steps of:

a spinneret forming a continuous-filament/air stream;

a fiberizer forming a short-fiber/air stream;

merging the continuous-filament/air stream with the short-fiber/air stream in a contact zone;

depositing the merged air streams on a zone of a conveyor as a nonwoven web such that the continuous filaments form a matrix holding the short fibers; and setting a portion of the nonwoven web in a press and heating the portion to 30 EC to 275 EC and at a pressure of at least 1 MPa to compress the portion into a molded part.

17 Claims, 3 Drawing Sheets

15
Fiberizer
16
12
13
17
V2
6
V3
V1
S2
S3
7
S1
5
5
α1
α2
4
14
8
18
2
3
9
F
V4
25

11
2
21
11a
1
11b 11
2
21
11a
22
1
11b
2

11
11a
1
2
11b

METHOD OF MAKING A MOLDED PART AND PART MADE THEREBY

FIELD OF THE INVENTION

The present invention relates to a method of making a molded part. This invention also concerns the part made by this method.

BACKGROUND OF THE INVENTION

The molded parts according to the invention may be in particular containers for holding and/or packaging foodstuffs, for example meals. According to a preferred embodiment, the molded parts according to the invention are food trays or other disposable tableware. In addition, the molded parts according to the invention can be structural components for the interior of automobiles, for example liners. In principle, other possible applications of the molded parts according to the invention are within the scope of the invention.

Such molded parts known from practice consist of plastic materials. There are for example plastic trays for food known are manufactured by thermoforming. Structural components for automobiles usually consist of plastic. Such molded plastic parts and the corresponding manufacturing processes are not environmentally friendly. The molded parts usually consist entirely or to a very large proportion of plastics or raw materials that are made from crude oil.

In addition, molded parts are known consisting of cellulose and thus of renewable raw materials. The manufacturing processes for such cellulose or cellulose-based molded parts are often complex and cost-intensive and therefore uneconomical. In addition, the mechanical properties of the molded parts, for example their mechanical strength and/or their flexibility do not meet all requirements. In this respect there is a need for improvement in the measures known from the practice on the one hand with regard to the sustainability of the molded parts, for example with regard to the raw materials used, and on the other hand with regard to the mechanical properties of the molded part. This is where the invention comes in.

OBJECTS OF THE INVENTION

It is therefore an object of the present invention to provide an improved method of making a molded part.

Another object is the provision of an improved molded part that overcomes the above-given disadvantages, in particular that is environmentally sustainable or the uses of renewable, raw materials and that nevertheless meets all requirements with regard to its mechanical properties.

SUMMARY OF THE INVENTION

For attaining this object, the invention teaches a method of making a molded part from at least a nonwoven, where the at least one nonwoven has at least a layer, in particular a single layer, of a continuous-filament/short-fiber mixture. At least one spinneret generates a stream carrying continuous filament and at least one fiberizer generates a fiber-carrying air stream. Furthermore the filament-air stream and the fiber-air stream are merged in a contact zone and are then brought together as a filament/fiber mixture on a deposit conveyor as a nonwoven web. The continuous filaments of filament/fiber mixture deposited on the conveyor form a matrix holding the short fibers. Finally, the at least one nonwoven is set in a press mold heated to a temperature in the range from 30 EC to 275 EC, preferably from 60 EC to 260 EC, preferably from 100 EC to 250 EC, and is compressed with a forming pressure of at least 1 MPa, preferably from 2 MPa to 40 MPa, preferably from 3 MPa to 30 MPa, further preferably from 4 MPa to 25 MPa, very preferably from 5 MPa to 23 MPa, especially preferably from 6 MPa to 22 MPa, all especially preferably from 7 MPa to 21 MPa, for example from 15 MPa to 20 MPa, for formation into the molded part. According to a further preferred embodiment of the invention, the at least one nonwoven web is heated to a temperature in the range from 100 EC to 200 EC.

In the context of the invention, the fact that a forming pressure is applied to the at least one nonwoven web in the press mold means in particular that at least one element of the press mold, preferably a compression die, acts on the at least one nonwoven web with the corresponding forming pressure or is pressed onto the at least one nonwoven web. It is possible that the at least one nonwoven in the press mold is subjected to an isostatic forming pressure in the specified range. In this case, the press mold or the press mold environment is suitably designed accordingly, for example a closed pressure chamber can be provided.

The term "filament air stream" is meant in the context of the invention in particular to denote a stream of continuous filaments and air made by a spinneret. The filament-carrying air stream flows within the framework of the method according to the invention preferably toward the at least one short-fiber air stream and/or toward the deposit conveyor. "Fiber-carrying air stream" means in the context of the invention in particular a stream of short fibers and air generated by a fiberizer and flowing toward the deposit conveyor and/or toward the at least one filament-air stream. As used here, continuous filaments are of quasi endless length whereas fibers have shorter lengths of for example 0.1 mm to 60 mm.

In accordance with the invention, at least one filament-air stream is brought together with the at least one, in particular with a single fiber-carrying air stream in a contact zone. In the context of the invention, the contact zone is located in particular above the deposit conveyor, preferably above the screen belt, so that the at least one filament-air stream and the at least one short-fiber air stream are brought together above the deposit conveyor in the contact zone. In the contact zone a mixing of the at least one filament-carrying air stream and the fiber-carrying air stream takes place. According to a preferred embodiment of the method according to the invention, the filament/fiber mixture made in this way flows from the contact zone to the deposit conveyor as a homogeneous or essentially homogeneous mixture. The mixing and distribution of the short fibers and of the continuous filaments in the filament/fiber mixture according to the invention produces particularly advantageous properties of the deposited nonwoven and of the corresponding shaped part. For example, there are a relatively low proportion of the continuous filaments in the at least one nonwoven web or in the molded part, so that the continuous filaments form a matrix in a functionally reliable manner in which the short fibers are embedded, so that advantageous mechanical properties of the molded part can be ensured.

According to a preferred embodiment the deposit conveyor is a screen belt, particularly preferably an air-permeable screen belt. According to a particularly preferred embodiment, the screen belt or the air-permeable screen belt is continuously movable, in particular endless.

According to the invention, the at least one nonwoven web is set in a press mold and heated to a temperature in the range from 30 EC to 275 EC, preferably from 60 EC to 260 EC, preferably from 100 EC to 250 EC. Conveniently this heating of the nonwoven takes place by tempering the press mold. In this context, tempering of the press mold means in particular involves heating or warming the press mold. In principle it is also possible that the nonwoven is already heated to the corresponding temperature before being set in the press mold or at least partially heated or preheated. This can be done, for example, by heating devices upstream of the press mold. Further according to the invention the nonwoven is subjected to a forming pressure of at least 1 MPa, preferably from 2 MPa to 40 MPa, preferably from 3 MPa to 30 MPa, more preferably from 4 MPa to 25 MPa, very preferably from 5 MPa to 23 MPa, particularly preferably from 6 MPa to 22 MPa, very particularly preferably from 7 MPa to 21 MPa, for example from 15 MPa to 20 MPa and formed into the molded part. Conveniently, the nonwoven is already heated to the temperature in the range from 30 EC to 275 EC, preferably from 60 EC to 260 EC, preferably from 100 EC to 250 EC, before application of the forming pressure. In principle it is also possible that the nonwoven is already subjected to the forming pressure in the press mold before the (complete) heating to this temperature and first then, in particular by tempering of the press mold, (completely) heated to this temperature is, so that the heating or further heating of the nonwoven preferably takes place during the pressurization.

According to a particularly preferred embodiment of the method according to the invention, the at least one nonwoven is first set in the press mold, subsequently by tempering the press mold heated to a temperature in the range from 30 EC to 275 EC, preferably from 60 EC to 260 EC, preferably from 100 EC to 250 EC and the heated nonwoven is subsequently subjected to the forming pressure in the press mold and formed into the shaped part.

It has proven itself that the nonwoven set in the press mold is compressed for a period from 0.01 to 25 seconds, preferably from 0.05 to 20 seconds, preferably from 0.1 to 15 seconds, especially preferably from 0.2 to 10 seconds.

A particularly preferred embodiment of the method according to the invention is characterized in that the press mold has an upper mold part and a lower mold part and the upper mold part and/or the lower mold part preferably are designed as a press plunger. Preferably, the upper part of the mold is designed as the press plunger. The lower part of the mold is also preferably designed as a complementary cavity for the press plunger. The forming pressure applied to the at least one nonwoven in the press mold is expediently the pressure with which the press plunger acts on or presses the nonwoven set in the press mold. When the mold is tempered according to a preferred embodiment, preferably the upper mold part and/or the lower mold part, preferably the upper mold part and the lower mold part, are tempered.

It is in the context of the invention particularly preferable that the at least one spinneret is a melt-blowing spinneret and preferably at least two, in particular just two, melt-blowing spinnerets are provided so that especially preferably at least two, filament-carrying air streams comprising continuous filaments are generated and are merged in the contact zone with the one short-fiber air stream. If the spinneret or the spinnerets according to a preferred embodiment are designed as melt-blowing spinnerets, they extrude molten plastic filaments (melt-blowing continuous filaments) into a high-speed compressed-air stream. The compressed air exits also from the respective melt-blowing spinneret and is preferably warm or hot. The at least one melt-blowing spinneret thus emits streams of the generated continuous filaments and the compressed air toward the short-fiber stream and/or toward the deposit conveyor.

A preferred embodiment of the invention is characterized in that the at least one melt-blowing spinneret is designed as a single-row nozzle having a plurality of nozzle openings arranged in a single row and preferably two air inflow gaps running parallel to the row of nozzle openings flanking and inclined in particular toward the row of nozzle openings, from which compressed air emerges. The two melt-blowing spinnerets are expediently designed in this way. It is also possible that at least one of the melt-blowing spinnerets, preferably the two melt-blowing spinnerets, is/are designed as a multirow nozzle, in which a plurality of nozzle openings arranged in several rows are present, each nozzle opening preferably being assigned a (separate) air inflow opening from which a respective substream of compressed air emerges.

According to a preferred embodiment of the invention, the melt-blowing continuous filaments flow from the at least one spinneret or melt-blowing spinneret as a (first) filament-air stream with an initial volume flow V2 in a direction S1. A second melt-blowing spinneret emits a (second) filament-air stream with an initial volume flow V3 in a direction S3 toward the short-fiber air stream and/or toward the deposit conveyor. Initial volume flow V2 or V3 are determined directly or immediately below the respective or melt-blowing spinneret present after the filaments are entrained by air, in particular compressed air.

The at least one short-fiber air stream flows with an initial volume flow V1 toward the deposit conveyor and/or toward the at least one filament-carrying air stream. "Initial volume flow" V1 then means in particular the volume flow directly or immediately after the outlet from the short fiber generating device or fiberizer. It has proven itself that in the deposit area of the continuous filament the air or process air is aspirated through the screen belt with a volume flow V4. For this purpose at least one suction device, in particular a suction fan, is provided below the deposit conveyor in particular below the deposit area. A preferred embodiment of the method according to the invention is characterized that the volume flow V4 of air sucked through the deposit conveyor, is greater than the sum of the volume flow's V1 and V2, so that V4>(V1+V2). If at least two spinnerets or melt-blowing spinnerets are present, it is particularly preferred that the volume flow V4 be greater than the sum of the volume flow's V1, V2 and V3, so that V4>(V1+V2+V3). According to a particularly preferred embodiment of the method according to the invention the volume flow V4 corresponds to between 1.05 and 30 times, preferably between 5 and 25 times, preferably between 10 and 20 times the sum V1+V2 and/or the sum V1+V2+V3, depending on how many melt-blowing spinnerets are provided. Due to these special flow conditions, a particularly good mixing of the short fibers and the continuous filaments and an advantageous uniformity of the distribution of continuous filaments and short fibers in the deposited nonwoven web and in the molded part can be achieved in the method according to the invention. As a result, the proportion of continuous filaments required can be further reduced and the molded part nevertheless will meet all requirements.

It has proven itself that in the case of two spinnerets, in particular melt-blowing spinnerets, the first filament-air stream flows in the conveying direction F of the deposit conveyor upstream of the fiber-carrying air stream and that the second filament-air stream flows in the conveying direction F of the deposit conveyor downstream of the short-fiber air stream. The fiber-carrying air stream is thus centrally between and flanked in the conveying direction by the two filament-air streams.

According to a preferred embodiment of the method according to the invention the filament-air stream meets the fiber-air stream in the contact zone in an acute angle $\alpha 1$, preferably in an angle $\alpha 1$ from 10° to 80 E, preferably from 20° to 75 E, especially preferably from 30° to 65° to the at least one fiber-carrying air stream and/or the second filament-carrying air stream meets the fiber-carrying stream in the contact zone at an acute angle $\alpha 2$, preferably in a angle $\alpha 2$ from 10 E to 80 E, preferably from 20° to 75 E, especially preferably from 30 E to 65 E. The angles $\alpha 1$ and $\alpha 2$ refer in particular to the flow directions or flow vectors of the fiber-carrying air stream and of the filament-carrying air streams or streams in or shortly above the contact zone and denote as it were the inclination angle where the filament-carrying air streams meet the fiber-carrying air stream at the contact zone.

According to a preferred embodiment of the invention, the flow of the at least one filament-carrying air stream, in particular the two filament-air streams, with respect to their direction of flow along the entire flow path, in particular in a straight line or in essentially in a straight line, is from the respective spinneret, in particular melt-blowing spinneret, to the contact zone at the angle $\alpha 1$ or $\alpha 2$ to the flow direction of the fiber-carrying air stream. That the filament-carrying air stream or streams with regard to their flow directions move at an angle $\alpha 1$ or $\alpha 2$ to the flow direction of the fiber-carrying air stream, means in the context of the invention in particular that the flow vector of the filament-carrying air streams at least in sections or in sections are at an angle $\alpha 1$ or $\alpha 2$ to the flow vector of the fiber-carrying air stream. In the context of the invention, the terms "flow direction" and "flow vector" in particular the mean flow direction or the mean flow vector of the respective stream.

It has proven itself that the angles $\alpha 1$ and $\alpha 2$ have the same value, so that the both filament-carrying air streams in the contact zone preferably symmetrically meet from both sides the central fiber-carrying air stream. The fiber-carrying air stream flows preferably with respect to its flow direction S1 vertically or essentially perpendicular to the surface of the deposit conveyor. This means in the context of the invention in particular that the flow vector of the fiber-carrying air stream is vertical or essentially perpendicular to the horizontally extending planar upper face of the deposit conveyor. The embodiment with the angles $\alpha 1$ and $\alpha 2$ in which the filament-carrying air streams in the contact zone meet the fiber-carrying air stream, is based on the discovery that with these angles a particularly optimal mixing of the continuous filaments and of the short fibers in the contact zone can be achieved and that particularly preferably a homogeneous or essentially homogeneous continuous-filament/short-fiber mixture can be deposited on the delivery belt to form the nonwoven web. If the angles $\alpha 1$ and $\alpha 2$ according to a particularly preferred embodiment have the same value, this mixing of the continuous filaments and of the short fibers is further improved. It is advantageous if the filament/fiber mixture flows from the contact zone to the deposit conveyor belt vertically or essentially perpendicularly to the deposit conveyor surface with respect to its flow direction.

It is within the scope of the invention that the at least one spinneret or melt-blowing spinneret, preferably the at least two, in particular two melt-blowing spinnerets, are set at an angle of inclination to the short-fiber generating device, in particular to an outlet passage of this short-fiber generating device. The angle of inclination between the spinnerets, in particular between the melt-blowing spinnerets, and of the short fiber generating device or the outlet passage of the short fiber generating device is typically for each filament-carrying stream 10° to 80°, preferably 20° to 75°, particularly preferably 30° to 65°. In this manner, the spinners can discharge in particular from the melt-blowing spinnerets, filament-carrying air streams at the angle $\alpha 1$ or $\alpha 2$ to the flow direction of the short filament-carrying air stream and toward the short-fiber air stream. It recommended that the inclination angle between the spinnerets and the outlet passage is individually adjustable.

According to a preferred embodiment of the invention the continuous filaments are made from at least one thermoplastic polymer. Preferably the continuous filaments are made from at least one polyolefin, preferably from polypropylene and/or polyethylene, particularly preferably from polypropylene. According to a further preferred embodiment the continuous filaments are made from at least one polyester, preferably from polylactide and/or polyethylene terephthalate, especially preferably from polylactide. According to another preferred embodiment of the invention the continuous filaments are made from polyvinyl alcohol. In principle, the continuous filaments can also be made from other thermoplastic polymers, for example from polyamide, and from mixtures of the above-mentioned thermoplastic polymers. According to a preferred embodiment of the invention, the at least one nonwoven web is heated during the method according to the invention to a temperature which is below the melting temperature of the at least one thermoplastic polymer of the continuous filaments. It is recommended that the continuous filaments have an average filament diameter of 0.2 to 15 Φm, preferably of 0.5 to 12 Φm, preferably of 0.5 to 10 Φm, in the case of the continuous filaments are entirely especially preferably for melt blowing.

According to a preferred embodiment of the invention, the continuous filaments are made from at least one biodegradable thermoplastic polymer, preferably from polylactide and/or polyvinyl alcohol. Moreover, it has proven to be the case that the continuous filaments consist or essentially consist of the above-mentioned thermoplastic polymers or mixtures thereof.

According to the invention with at least one fiber-generating device generates at least one fiber-carrying air stream. Conveniently the at least one fiber-generating device is a fiberizer and generates fibers of the at least one fiber-carrying air stream are generated and the fiber-carrying air stream is preferably guided through an outlet passage and exits there from perpendicularly or in essentially perpendicularly to the surface of the deposit conveyor. According to a particularly preferred embodiment, the fiber-carrying air stream exits from the outlet passage with the initial volume flow V1 from and flows with the flow direction S1 toward the deposit conveyor. The outlet passage is expediently part of the fiber generator, in particular of the fiberizer. The initial volume flow V1 means expediently the volume flow of the fiber-carrying air stream directly or immediately after leaving the outlet passage. It is preferred that the fiberizer is a saw mill.

It has proven itself that the generated fiber-carrying air stream is accelerated in the outlet passage, in particular by a blower of the short fiber generation device or the fiberizer. The fiber generating device thus has according to a preferred embodiment a blower that supplies air to the device. It is within the scope of the invention that the air flow for generating the fiber-carrying air stream in the fiber-generating device, respectively in the fiberizer, is generated by the fiberizer and/or by the blower. The preferably in the outlet passage accelerated short fiber-carrying air stream exits from the outlet passage then with the initial volume flow.

It is preferred that of the fiber-carrying air stream has a portion of 0.0138 kg to 0.0833 kg, preferably of 0.0222 kg to 0.0694 kg, preferably from 0.0277 kg to 0.05 kg of short fibers per kg air exiting the short fiber generating device, in particular from its outlet. It is furthermore preferred that the at least one filament-carrying air stream or the two filament-carrying air streams (respectively) exits the melt-blowing spinneret(s) with a portion from 0.002 kg to 0.5 kg, preferably from 0.01 kg to 0.25 kg, preferably from 0.015 kg to 0.12 kg, particularly preferably from 0.018 kg to 0.1 kg of the continuous filaments per kg air.

According to a preferred embodiment of the method according to the invention the fibers of at least one nonwoven or at least one layer of the nonwoven are natural. In this case, the short fibers are natural short fibers. In the context of the invention, natural fibers or natural short fibers' means in particular fibers or short fibers made from renewable raw materials. Preferably, the short fibers of the at least one nonwoven web or at least one layer of the nonwoven web are made from cellulose or are cellulose. At least one layer of the nonwoven is made from at least one from the group comprising: "pulp, bagasse, cellulose, bamboo, cotton, and agricultural waste" and preferably is made from pulp. If the short fibers are made from pulp, the short fibers are pulp short fibers. The term "pulp" means in the context of the invention in particular a fibrous material on a basis of cellulose or wholly cellulose. Preferably in the context of the method according to the invention solid pulp is used. The term "solid pulp" means in this context in particular a dry material basically formed by pulp or cellulose. Particularly preferred in the framework of the invention a web made of solid pulp is defibered by the at least one fiberizer into pulp short fibers. The pulp used in the context of the method according to the invention is preferably conditioned. The short fibers, in particular the pulp short fibers, made in the at least one short-fiber generating device have a length or average length from 0.05 to 5 mm, preferably from 0.1 to 4 mm, particularly preferably from 0.1 to 3 mm.

It is within the scope of the invention that the portion of the continuous filaments in the at least one deposited nonwoven and/or in the molded part 0.5 wt % to 35 wt %, preferably 1 wt % by weight to 25% by weight, preferably 1% by weight to 15% by weight, particularly preferably 1% by weight to 10% by weight, very particularly preferably 1% by weight to 8% by weight, for example 1% by weight to 5% by weight. This embodiment is based on the discovery that the resulting molded part is characterized by a particularly satisfactory compromise between mechanical properties and sustainability, in particular through the use of sustainable or renewable raw materials. This applies in particular also for a portion of the continuous filaments in the at least one deposited nonwoven and/or in the molded part in the range of 1 wt. % to 10% by weight, preferably from 1% to 8% by weight, preferably from 1% by weight to 5% by weight. The resulting molded part is then predominantly short fibers, in particular natural short fibers, preferably pulp fibers, and therefore is similar to paper, and the continuous filaments nevertheless form a functionally reliable matrix for the short fibers.

It is further preferred that the portion of the short fibers in the deposited nonwoven and/or in the molded part is 65 wt. % by weight to 97% by weight, preferably 70% by weight to 95% by weight, preferably 75% by weight to 95% by weight.

A further embodiment of the method according to the invention is characterized in that the nonwoven has at least two layers of the continuous-filament/short-fiber mixture, preferably made simultaneously and/or successively and deposited one above the other on the at least one depositing conveyor, and the continuous filaments of the filament/fiber mixture or of the layers each form a matrix in which the short fibers are embedded. The two layers of each filament/fiber mixture are preferably made with two nonwoven production devices arranged one behind the other in the conveying direction F of the delivery conveyor consisting of at least one spinneret, preferably from at least two spinnerets and at least one short fiber-generating device. With regard to the preferred properties of the filament/fiber mixture of the second layer, the above explanations apply analogously in particular. It is possible that the continuous filament-short fiber mixtures of the at least two layers differ in their composition. According to another embodiment, the filament/fiber mixtures of the at least two layers have the same or substantially the same composition. According to a preferred embodiment the devices for generating the continuous-filament and fiber streams are arranged above the same delivery conveyor, so that the at least two layers of the nonwoven are deposited one above the other on the same deposit conveyor.

It is possible that the nonwoven has at least three, in particular at least four layers of a filament/fiber mixture and that there are respective nonwoven production devices for making the filament/fiber mixtures. It is also possible that the nonwoven has further layers, for example spunbond layers or melt-blown layers made with the appropriate spinnerets. Such spunbond layers and/or melt-blown layers can be final layers or intermediate layers between the layers of mixed continuous filaments and short fibers. According to an embodiment of the invention the nonwoven has only the at least one layer, in particular the one layer of a filament/fiber mixture, and thus preferably consists of at least one continuous filament-fiber mixture or essentially consists of at least one continuous-filament/short-fiber mixture.

As part of the method according to the invention, setting the at least one nonwoven web in the press mold according to a preferred embodiment can take place in such a way that the at least one nonwoven web is arranged as a nonwoven web in the press mold. Expediently, a punching and/or cutting of the nonwoven or of the molded part then takes place during or following the forming process or pressing process, so that in particular a single molded part results. However, according to another preferred embodiment, it is also possible that a piece is cute from the at least one nonwoven web and that the piece is then set in the press mold. In the context of the invention, setting the at least one nonwoven web in the press mold preferably means insertion of the at least one nonwoven web or cut nonwoven web into the press mold.

According to a preferred embodiment of the method according to the invention the setting of the at least one nonwoven in the press mold and the forming into the molded part in a method step which is locally and/or temporally separate from the nonwoven web production. It has proven itself particularly that the at least one nonwoven after deposition on the conveyor is taken off the deposit conveyor, wound into a roll and then unwound before setting in the press mold, preferably in a local and/or temporally separate a method step. Locally separate method step means in this context in particular that the at least one nonwoven is formed into the molded part in a device that is locally separate from the nonwoven production device for producing the at least one nonwoven device. This means particularly preferably that it is not a continuous method consisting of nonwoven production and immediately subsequent forming of the nonwoven into the molded part. In principle, however, such a continuous method is also within the scope of the invention. “Temporally separated method step” means in this context in particular that between the nonwoven web production and the forming of the at least one nonwoven web to the molded part there is some time for example several minutes, about more than 2 minutes, preferably more than 5 minutes, preferably more than 10 minutes, especially preferably more than 15 minutes or also several hours or several days. It is quite particularly preferred that the at least one nonwoven after deposition on the at least one deposit conveyor is detached from the deposit conveyor and wound up to a roll and that when required the nonwoven or the roll is unwound and the nonwoven is formed into the molded part.

It is possible in addition that the nonwoven is further treated on the at least one deposition conveyor, for example is consolidated and/or is mixed with at least one additive. It is also possible that the nonwoven is further treated after detachment from the at least one deposit conveyor in a separate step, for example, is consolidated and/or at least one additive is added. In the method according to the invention, the consolidating of the nonwoven web can be carried out by at least one calender. Conveniently, the at least one calender has at least one pair of calender rollers through which the nonwoven web is guided under pressure. The further treatment, in particular the dispersion into the nonwoven with additives, preferably by spraying, coating, laminating and the like, and/or consolidating of the nonwoven, preferably with a calender, can in accordance with a particularly preferable embodiment of the method according to the invention be done before the preferred winding of the nonwoven into a roll and/or after unwinding the nonwoven and is expediently carried out before the putting the nonwoven in the press mold.

Preferably, on at least an outer face of the nonwoven, preferably on both outer faces of the nonwoven, at least one barrier layer in the form of a final layer is applied, where the final layer is preferably a melt-blown nonwoven layer and/or a film. If the nonwoven has only a layer made of a filament/fiber mixture, it is thus possible that the final layer or barrier layer is applied to one or both outer faces of this fiber/filament core of the nonwoven. If the nonwoven according to one embodiment comprises two layers each of a filament/fiber mixture, thus a barrier layer in form of a final layer can be applied to the nonwoven outer face of one or both layers. Here, the outer face of the nonwoven web also means, in particular, the outer surface of the nonwoven web. The resulting nonwoven thus has preferably on one or on both of its outer faces a barrier layer in form of a final layer. In the context of the invention, the web can have at least one barrier layer for example as a barrier against fats and/or liquids, in particular water. If the molded part according to a preferred embodiment is a food packaging, for example a tray for food, the sealing or barrier layer, if it faces the food for example, prevents the penetration of fat into the molded part. If such food packaging or food tray has a sealing layer or barrier layer on the side facing away from the contents, the barrier layer can thereby prevent the complete passage of fat through the molded part, so that the tray can be held by a user in the hand, without undesirable leakage of grease.

The application of at least one barrier layer as a final layer to the nonwoven can take place in the context of the method according to the invention in accordance with an embodiment in the nonwoven production device on at least one deposit conveyor. Then in particular at least one spinneret, preferably at least one melt-blowing spinneret, can be connected upstream of at least one web generating device for generating the filament/fiber mixture upstream and/or downstream. It is also possible that the at least one barrier layer in form of a final layer is only applied to the nonwoven after detachment of the nonwoven from the deposition conveyor. This can for example also only take place in the press mold. For this purpose a final layer can preferably be affixed in the press mold and/or on the in the press mold set nonwoven for example a film. Then expediently in the course of the pressing process with the remaining nonwoven layers it is laminated in place. The nonwoven, which is at least one nonwoven, thus has preferably on one or on both outer faces a barrier layer in the form of a final layer.

According to a further preferred embodiment of the method according to the invention at least an outer boundary layer of the nonwoven and/or of the molded part is provided with at least an additive for adjustment of the mechanical and/or hydrophobic and/or oleophobic properties of the molded part, so that preferably at least one barrier layer of the molded part is made. The at least one additive can be applied according to an embodiment of the invention in the nonwoven production device for producing the at least one nonwoven web. The additive may be an avivage. “Outer boundary layer” of the nonwoven and/or of the molded part means in particular a nonwoven outer layer of an outer nonwoven layer into which the additive penetrates. The placement of the at least one outer boundary layer with the additive is expediently carried out on one or on both outer faces of the nonwoven or of the molded part.

It is also possible that the nonwoven is only mixed with the at least one additive after detachment from the at least one deposit conveyor, preferably before the preferred winding of the nonwoven up into a roll or after unwinding of the nonwoven from the roll. In the context of the method according to the invention, the application of the at least one additive can take place, for example, by spraying the nonwoven with the at least one additive, in particular in the form of an avivage.

It is furthermore possible that the at least one additive is only applied to at least an outer boundary layer of the molded part after the forming of the nonwoven into the molded part. Also in this case the application of the additive takes place expediently on one outer face of the molded part or on both outer faces of the molded part. According to a preferred embodiment the at least one outer boundary layer of the nonwoven and/or of the molded part is produced by at least an additive that forms at least one barrier layer of the molded part. The additive can for example set the hydrophobic and/or oleophobic properties of the molded part so that the boundary layer is formed bu the at least an additive on of the nonwoven and/or the molded part. The molded part thus has hydrophobic and/or oleophobic properties and thus as it were as a barrier against liquids, in particular water, and/or fats. It is also possible within the scope of the invention that the at least one end layer of the nonwoven web described above to form the outer boundary layer of the nonwoven web or be part of this outer boundary layer, which is preferably mixed with the at least one additive.

A particularly preferred embodiment of the method according to the invention is characterized in that at least two nonwovens, preferably at least three nonwovens are set as a stack in the press mold and the nonwoven stacks are heated in particular by tempering the press mold to a temperature in the range from 30 EC to 275 EC, preferably from 60 EC to 260 EC, preferably from 100 EC to 250 EC and where the nonwoven stack, preferably the heated nonwoven stack, is compressed with a forming pressure from to at least 1 MPa, preferably from 2 MPa to 40 MPa, preferably from 3 MPa to 30 MPa, further preferably from 4 MPa to 25 MPa, very preferably from 5 MPa to 23 MPa, especially preferably from 6 MPa to 22 MPa, all especially preferably from 7 MPa to 21 MPa, for example from 15 MPa to 20 MPa and is thereby formed into the molded part. It has proven itself in this context that the at least two nonwovens are first made separately from one another and preferably after their respective deposit on a deposit conveyor are detached from the deposit conveyor and are each wound into a roll are wound up and then completely especially preferably for the arrangement and forming in the press mold, very preferably in a locally and/or temporally separate method step, the respective nonwoven or roll is unwound again. The respective roll is unwound again and the nonwovens are set on top of each other as nonwoven stacks in the press mold.

The at least one nonwoven has in the context of the invention in particular a thickness of 0.1 to 3 mm, preferably of 0.2 to 2 mm and preferably of 0.3 to 1, 5 mm. The thickness of the nonwoven is thereby in particular the greatest thickness of the nonwoven transversely, in particular perpendicularly or essentially perpendicularly to its planar extension. The thickness refers to in particular to the optionally consolidated nonwoven before being formed into the molded part. It is further preferred that the nonwoven has a basis weight in the range from 10 $g/m^2$ to 1000 $g/m^2$, preferably from 100 $g/m^2$ to 300 $g/m^2$.

For attaining the invention object, the invention further teaches a molded part, in particular made with a method described above, wherein the molded part comprises at least one nonwoven having at least one layer, in particular a layer consisting of a continuous-filament/short-fiber mixture and preferably consists of the mixture or essentially of it, and comprises the filament/fiber mixture and the continuous filaments form a matrix for the short fibers.

According to a particularly preferred embodiment the molded part has a two-dimensional or three-dimensional structure. Preferably the molded part is a container for holding and/or packaging of food, for example a tray for food. According to one embodiment, the molded part according to the invention can also be disposable tableware or be a structural component for an automobile.

According to a preferred embodiment of the invention, at least an outer boundary layer of the molded part forms a barrier layer having a water absorption capacity of less than 300%, preferably less than 30%, preferably less than 15%, very preferably less than 5%, particularly preferably less than 2.5%, very particularly preferably less than 1%, of the mass of the at least one nonwoven web, in particular the total mass of the molded part, and/or has a fat absorption capacity of less than 300%, preferably less than 30%, preferably less than 15%, very preferably less than 5%, particularly preferably of less than 2.5%, very particularly preferably of less than 1%, of the mass of the at least one nonwoven web, in particular of the total mass of the molded part, and the outer boundary layer is preferably biodegradable. If the molded part according to one embodiment comprises more than one nonwoven web, for example two nonwoven webs, the mass refers in particular to these (two) nonwoven webs. It is also possible that the at least one final layer described above forms the outer boundary layer or barrier layer or is part of the outer boundary layer or barrier layer having the above-mentioned water absorption capacity and/or grease absorption capacity.

According to one embodiment of the invention, the at least one nonwoven is biodegradable. According to a particularly preferred embodiment the molded part is thus also biodegradable. "Biodegradable" in the context of the invention means in particular that the layer or the nonwoven or the entire molded part consists of biodegradable materials. This can be realized for example, as a thermoplastic polymer for the continuous filaments a biodegradable thermoplastic polymer, for example a polyester, in particular polylactide, and/or polyvinyl alcohol. It is in this context within the framework of the invention that the continuous filaments are made of at least one biodegradable thermoplastic polymer, preferably from polylactide and/or polyvinyl alcohol.

The invention is based on the discovery that with the method according to the invention a molded part can be provided that is characterized by an optimal compromise of sustainability in particular by the predominant use of materials based on renewable raw materials and satisfactory mechanical properties. Due to the in the context of the inventive method the achieved optimal mixing of continuous filaments and short fibers in the filament/fiber mixture, can make a molded part that is characterized by an advantageously low proportion of continuous filaments and according to a particularly preferred embodiment consists of a predominant proportion of natural short fibers, in particular of pulp short fibers. Nevertheless, the continuous filaments form a functionally reliable matrix for the short fibers, so that the molded part also meets all requirements with regard to its mechanical properties. Nevertheless, in the context of the inventive method a surprisingly low proportion of continuous filaments is required in the molded part. If, according to a preferred embodiment, continuous filaments based on a biodegradable thermoplastic polymer are used, it is also possible to provide, a molded part that is completely or essentially completely biodegradable. It is also to be emphasized that the advantages described above in the context of the method according to the invention are achieved by fewer complex measures and that the method according to the invention in this respect also is characterized by high economic efficiency. This is to be emphasized in particular against the background, when the corresponding molded parts for example are used as containers for holding and/or packaging food.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
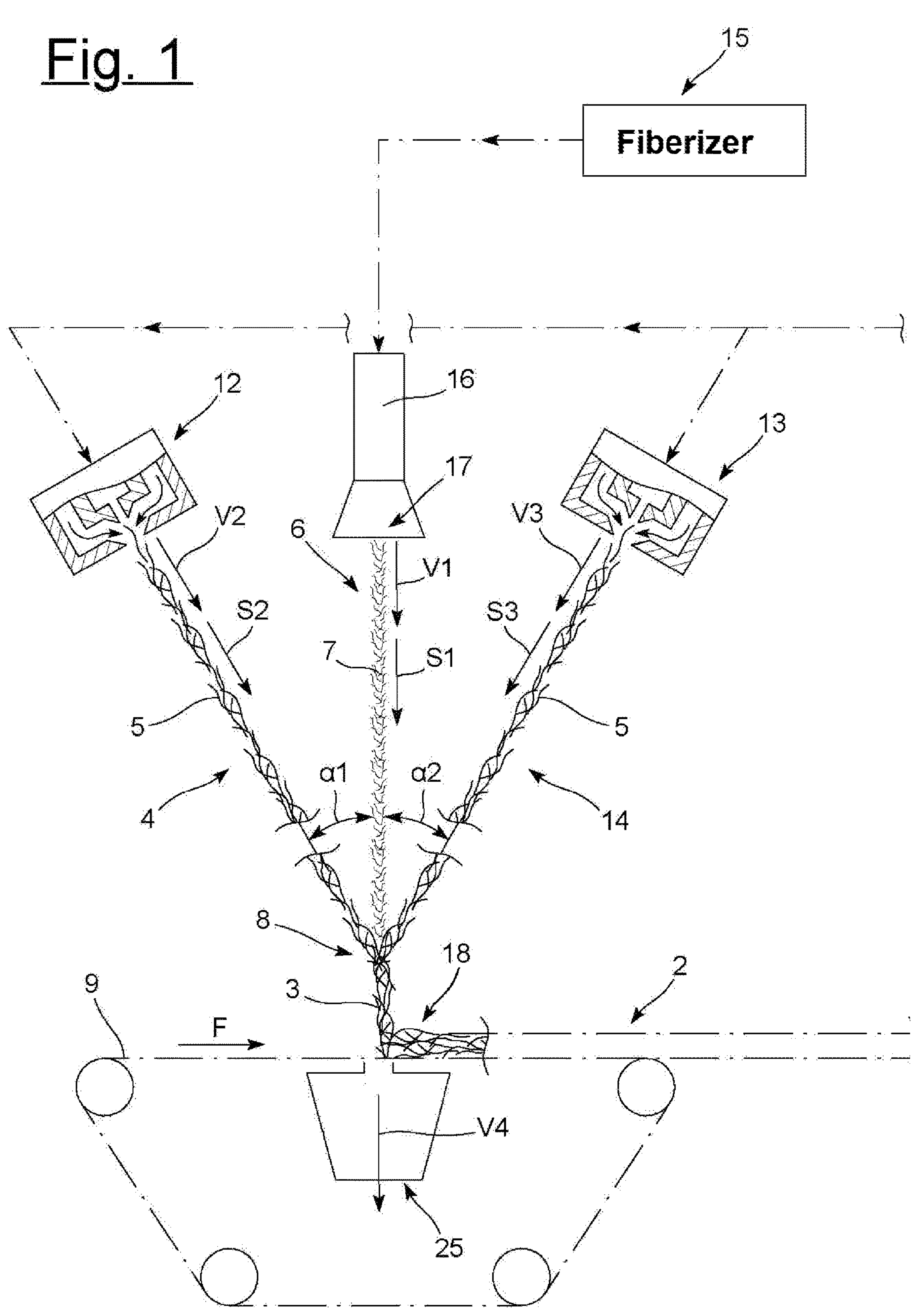
FIG. 1 is a vertical section through an upstream portion of an apparatus for making a nonwoven web according to the invention.

FIG. 1 shows part of an apparatus for making nonwoven 2 with a layer 18 from a mixture 3 of continuous filaments and short fibers. Here, the continuous filaments 5 are made by two melt-blowing spinnerets 12, 13. These continuous filaments 5 may be made from at least one thermoplastic polymer, for example from polypropylene and/or polylactide. A fiberizer or fiberizer 15 produces the short fibers 7 and may be a sawmill. The short fibers 7 are in particular pulp. The fiberizer 15 emits the pulp in an air stream 6 that conveys the short fibers 7. The fiberizer 15 has preferably an outlet passage 16 with an outlet nozzle 17. The air stream 6 carrying the fibers 7 is emitted from the outlet passage 16 with an initial volume flow V1 that is the volume flow of the fiber-carrying air stream 6 directly or immediately downstream of the nozzle 17 of the passage 16. The fiber-carrying air stream 6 flows in a direction S1 that preferably and here is vertical or essentially perpendicular to an upper face of an upper reach of a screen deposition belt 9 upon the stream 6 lands at a deposition zone 18. The air-permeable screen belt 9 here is endless and circulates.

The spinnerets 12 and 13 emit respective filament-carrying air streams 4 and 14 with initial volume flows V2 and V3 toward the fiber-carrying air stream 6. Initial volume flow V2 or V3 is in particular the volume flow directly or directly below of the melt-blowing spinnerets 12 and 13 of the filament-carrying air streams 4 and 14.

According to the invention the first filament-carrying air stream 4 flows upstream toward the fiber-carrying air stream 6 in a respective flow direction S2 at an angle α1 to the flow direction S1 of the fiber-carrying air stream 6. The second filament-carrying air stream 14 flows preferably and downstream the travel direction F of the screen belt 9 toward the fiber-carrying air stream 6. This second filament-carrying air stream 14 flows with respect to its flow direction S3 further preferably and according to FIG. 1 at an angle α2 to the flow direction S1 of the fiber-carrying air stream 6. The filament-carrying air stream 4 and 14 thus move preferably and here from both sides of the central fiber-carrying air stream 6 at the angles α1 and α2 to the fiber-carrying air stream 6.

Conveniently and here, the filament-carrying air streams 4 and 14 and the fiber-carrying air stream 6 merge above the screen belt 9 in a contact zone 8 and proceed downward from there as a mixed fiber/filament air stream 3 to the deposit zone 18 on the deposit belt 9. According to the invention, the continuous filaments 5 of the deposited filament/fiber mixture 3 form a matrix 10 in which the short fibers 7 are embedded. Preferably and here the filament-carrying air streams 4 and 14 in the contact zone 8 are each at an acute angle α1 or α2 on the fiber-carrying air stream 6. Very preferably and here the angles α1 and α2 have the same value so that both filament-carrying air streams 4 and 14 in the contact zone 8 symmetrically flank the central fiber-carrying air stream 6 meet. In this embodiment the angles α1 and α2 are each about 30 E. The angles α1 and α2 are defined in particular by the flow directions or vector S1 of the fiber-carrying air stream 6 and S2 and S3 of the filament-carrying air streams 4 and 14 upstream in the vertical travel direction of the stream 7 of the contact zone formed the angles α1 and α2 formed by the filament-carrying air streams 4 and 14 upstream of the contact zone 8 with the fiber-carrying stream 6. In the frame of the invention and here the filament-carrying air streams 4 and 14 move along their entire flow path from the respective melt-blowing spinnerets 12, 13 to the contact zone 8 with regard to their flow direction S2 and S3 at the angles α1 or α2 to the flow direction S1 of the fiber-carrying air stream 6.

Preferably and here according to of the FIG. 1 air is drawn in at the deposit zone 18 of the filament/fiber mixture 3 on the screen belt 9. Process air is aspirated with a volume flow V4 from below through the screen belt 9. For this purpose preferably and here a suction device 25 is provided below the screen belt 9, in particular below the deposit zone 18. Preferably the volume flow V4 is greater than the sum of the volume flows V1, V2, and V3 so that V4>(V1+V2+V3).

Preferably the continuous filament/fiber mixture 3 flows from the contact zone 8 to the delivery belt 9 as homogeneous or essentially homogeneous mixture. The homogeneous filament/fiber mixture 3 is then deposited in the deposit zone 18 to the nonwoven 2 or to the nonwoven web. Further preferably and here the filament/fiber mixture 3 flows from the contact zone 8 to the deposit zone 18 with regard to its flow direction perpendicular or essentially perpendicular to the surface of screen belt 9.

Figure 2A:
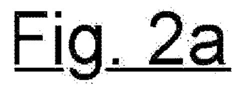
FIG. 2*a* is a side view of a downstream portion of the system partly shown in FIG. 1.
Figure 2B:
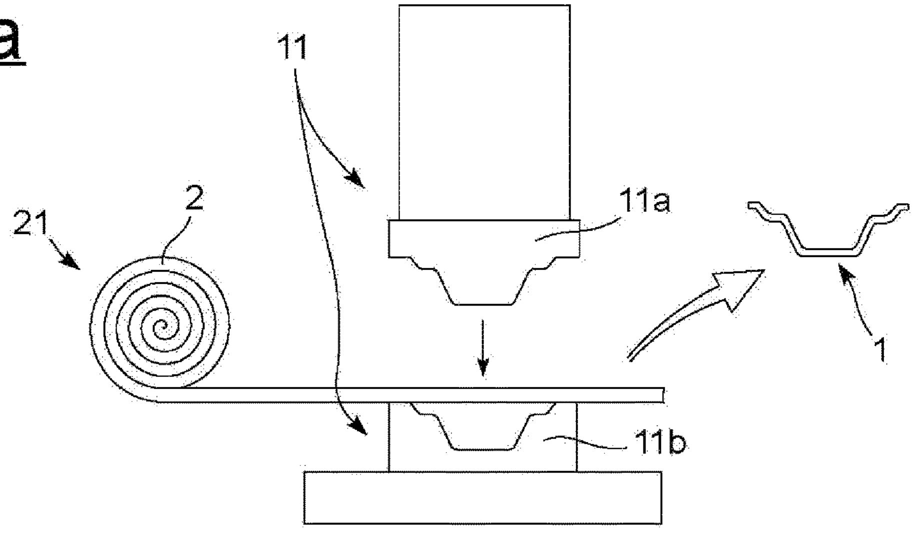
FIG. 2*b* shows the molding process according to the invention of a nonwoven stack to the molded part.
Figure 2B:
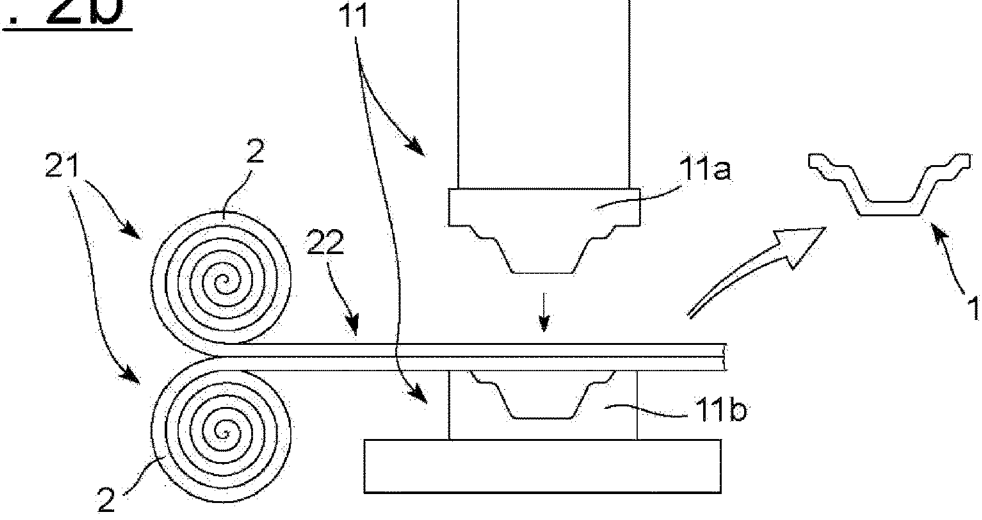

FIGS. 2*a* and 2*b* show steps of the forming process according to the invention of a nonwoven 2 (FIG. 2*a*) or a nonwoven stack 22 of two nonwovens 2 (FIG. 2*b*) to the molded part 1. Subsequent to the apparatus shown in FIG. 1, the at least one nonwoven web 2 according to a preferred embodiment of the invention is detached from the delivery wire belt 9 and wound up to a roll 21 not shown in FIG. 1. For introduction into a press mold 11, the nonwoven 2 or the roll 21 is unwound, so that the method steps carried out in FIG. 1 and FIGS. 2*a-c* can be done separately.

Figure 2C:
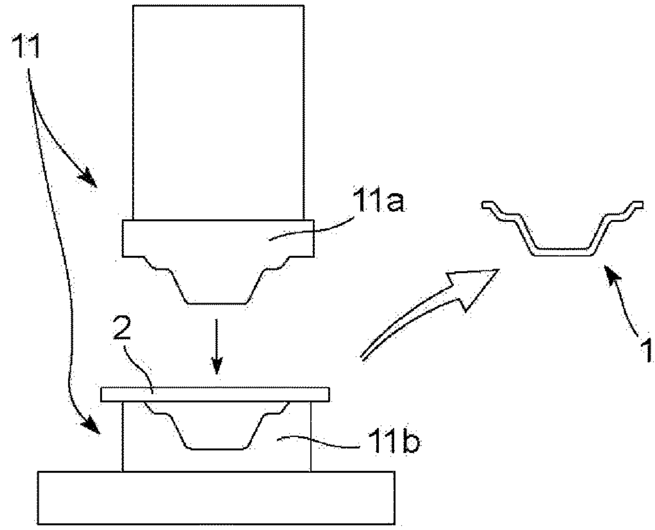
FIG. 2*c* shows the molding process according to the invention of a nonwoven web made with the apparatus according to FIG. 1 and subsequently trimmed to form the molded part.

Conveniently and according to FIGS. 2*a* and 2*b*, the nonwoven web 2 or the nonwoven web stack 22 set in the press mold 11 in the form of a nonwoven web or in the form of nonwoven webs. Preferably and here according to FIGS. 2*a* and 2*b*, punching and/or cutting of the nonwoven web 2 or the nonwoven web stack 22 or the molded part 1 then takes place during or following the forming or pressing process, so that in particular a single molded part 1 results. FIG. 2*c* shows the forming process of a nonwoven web 2 according to the invention, which was preferably and according to FIG. 2*c* first cut from a nonwoven web and then set as a cut nonwoven web 2 in the press mold 11.

The nonwoven 2 preferably and here according to FIGS. 2*a* and 2*c* is heated and compressed in a press mold 11, which preferably and here consists of an upper mold part 11*a* designed as a press plunger and a lower mold part 11*b* preferably and here designed as a complementary cavity element for the press plunger. The press mold 11 is heated to a temperature in the range from 30 EC to 275 EC, preferably from 100 EC to 250 EC. Preferably and here the heated nonwoven 2 is then subjected to a forming pressure of at least 1 MPa, preferably from 2 MPa to 40 MPa and thereby shaped into the molded part 1. Since the nonwoven 2 is compressed in the press mold 11 in that the upper mold part 11*a*, designed as a press plunger, acts on the nonwoven 2 with the forming pressure and is pressed onto the nonwoven 2. This is shown in FIGS. 2*a*, 2*b* and 2*c* by arrows.

In FIG. 2*b* in the two nonwovens 2 are formed into a nonwoven stack 22 in the press mold 11. Heating the nonwoven stack 22 and the deforming with the forming pressure to create the molded part 1 takes place analogous to the method described above with a single nonwoven 2 in FIG. 2*a* or 2*c*. Within the scope of the invention, it is possible that the nonwoven web stack 22 is a stack of cut-to-size nonwoven webs 2. Moreover, the molded part 1 is preferably and here according to FIGS. 2*a* to 2*c* designed as a tray for food.

Figure 3A:
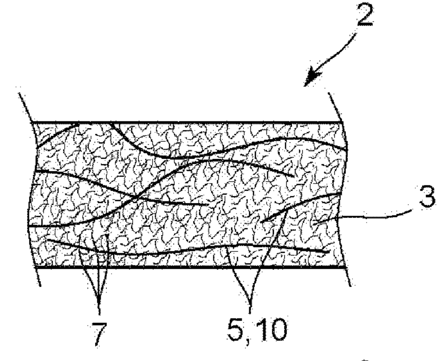
FIGS. 3*a*, 3*b*, 3*c*, and 3*d* are sections through different embodiments of nonwovens before being thermoformed into the molded part.

The FIGS. 3*a* to 3*d* each show a cross-section of a nonwoven 2 before forming into the molded part 1 in various embodiments. In FIG. 3*a* a nonwoven 2 is shown in a preferred embodiment as a single layer of a filament/fiber mixture 3. The filament/fiber mixture 3 has continuous filaments 5 and short fibers 7, and the continuous filaments 5 form a matrix 10 for the short fibers 7 in which the short fibers 7 are embedded.

Figure 3B:
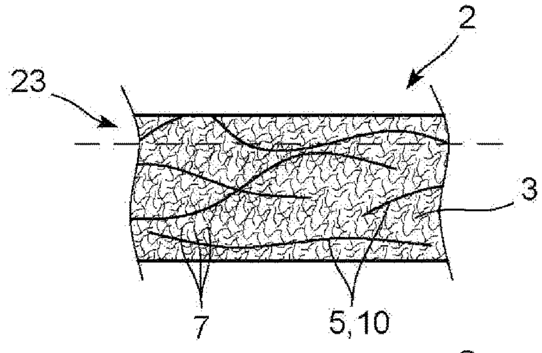

In of FIG. 3*b* a further preferred embodiment of a nonwoven 2 is shown, with an outer boundary layer 23 with at least an additive for adjusting the mechanical and/or hydrophobic and/or oleophobic properties of the molded part. The outer boundary layer 23 of the nonwoven 2 means here in particular a nonwoven outer section of the nonwoven layer 18. This is indicated in broken lines in FIG. 3*b*. In the preferred embodiment according to FIG. 3*b* an outer boundary layer 23 on an outer face of the nonwoven 2 is mixed with an additive. After the shaping step following, the displacement of the outer boundary layer 23 within the scope of the invention preferably results in a barrier layer of the molded part 1, which for example acts as a barrier against liquids, in particular water, and/or greases.

Figure 3C:
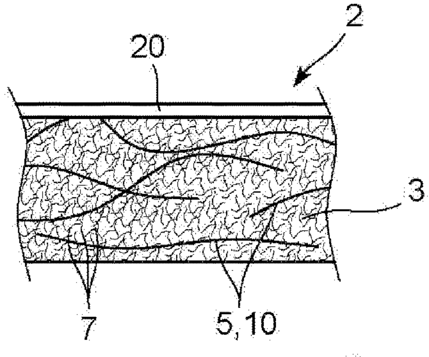

In FIG. 3*c* a further preferred embodiment of a nonwoven 2 with a layer 18 of a filament/fiber mixture 3 is shown. On an outer face of the nonwoven 2 a barrier layer in form a final layer 20 is applied that is preferably and here is a melt-blowing nonwoven layer. This barrier layer in the form of the final layer 20 can for example act as a barrier against liquids, in particular water, and/or fats.

Figure 3D:
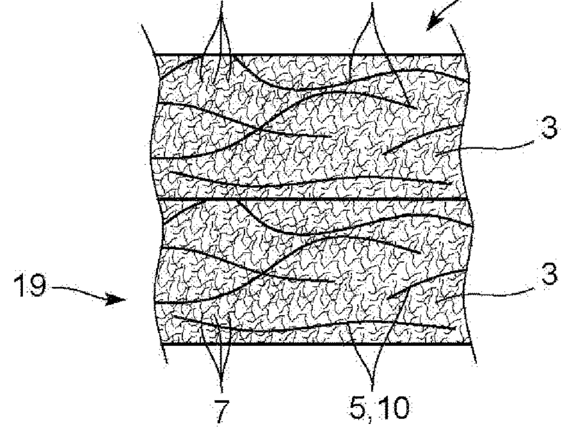

In of the FIG. 3*d* a further embodiment of a nonwoven 2 consisting of two layers 18 and 19 each of a continuous filament/fiber mixture 3 is shown. The continuous filaments 5 of the filament/fiber mixture 3 and of the layers 18 and 19 form in each case a matrix 10 in which the short fibers 7 are embedded.

Advantageously and here according to FIGS. 3*a* to 3*d* the continuous filaments may be formed basically by at least one thermoplastic polymer. The short fibers 7 may preferably and here be made from natural fibers and preferably from pulp. The proportion of the continuous filaments 5 in the at least one deposited nonwoven 2 is preferably 1 wt. % to 8 wt % and may in the embodiment example for example be 5 wt %.

We claim:

1. A method of making a molded part from at least one nonwoven web having at least one layer of a filament/fiber mixture, the method comprising the steps of:

a spinneret forming a continuous-filament/air stream;

a fiberizer forming a fiber/air stream;

merging the continuous-filament/air stream with the fiber/air stream in a contact zone to form a filament/fiber stream;

depositing continuous filaments and short fibers of the filament/fiber stream on a zone of a conveyor to form thereon a nonwoven web with the continuous filaments forming a matrix holding the fibers, a proportion of fibers in the deposited nonwoven web and/or in the molded part being 65% to 97% by weight; and setting a portion of the nonwoven web in a press and heating the portion to 30° C. to 275° C. and at a pressure of at least 1 MPa to compress the portion into the molded part.

2. The method according to claim 1, wherein the press mold has an upper mold part and a lower mold part forming a plunger press.

3. The method according to claim 1, wherein the continuous-filament/air stream meets the fiber/air stream at an acute angle of 10° to 80°.

4. The method according to claim 3, wherein there are two of the spinnerets generating respective continuous-filament/air streams that are merged with the fiber/air stream.

5. The method according to claim 4, wherein the continuous-filament air streams meet the fiber/air stream at acute angles of 10° to 80° and symmetrically flank the fiber/air stream.

6. The method according to claim 1, wherein the continuous filaments are made from polypropylene and/or polyethylene.

7. The method according to claim 1, wherein the continuous filaments are made from polylactide and/or polyethylene terephthalate and/or polyvinyl alcohol.

8. The method according to claim 1, wherein the fiberizer has an outlet from which the fiber/air stream is emitted downward toward the conveyor.

9. The method according to claim 1, wherein the fibers are of pulp, bagasse, cellulose, bamboo, cotton, or agricultural waste.

10. The method according to claim 1 wherein the nonwoven webs has two layers of a filament/fiber mixture one on top of the other that are formed into the molded part by the press.

11. The method according to claim 1, further comprising, after forming the nonwoven web on the conveyor and before setting the nonwoven web in the press, the steps of detaching the nonwoven web from the conveyor and rolling the detached nonwoven web up into a roll;

thereafter unrolling the web from the roll so a portion of it can be set in the press.

12. The method according to claim 1, further comprising, after forming the nonwoven web on the conveyor and before setting the nonwoven web in the press, the step of:

forming on a face of the nonwoven web a barrier layer that is a melt-blown nonwoven or a film.

13. The method according to claim 1, further comprising the step of:

forming a barrier layer on a face of the nonwoven web with an additive for adjusting mechanical, hydrophobic, and/or oleophobic properties of the molded part such that the barrier layer blocks liquid and/or gas.

14. The method according to claim 1, wherein two of the nonwoven webs are stacked and a portion of the two stacked nonwoven webs are set in the press.

15. The method according to claim 1, wherein the part is of two-dimensional or three-dimensional shape.

16. The method according to claim 1, further comprising the step of:

applying to the molded part an outer barrier layer having a water absorption capacity of less than 300% of the total mass of the molded part, and/or a fat absorption capacity of less than 300% of the total mass of the molded part.

17. The method according to claim 1, wherein the filaments or fibers constituting the molded part are biodegradable.

* * * * *